UNITED STATES PATENT OFFICE.

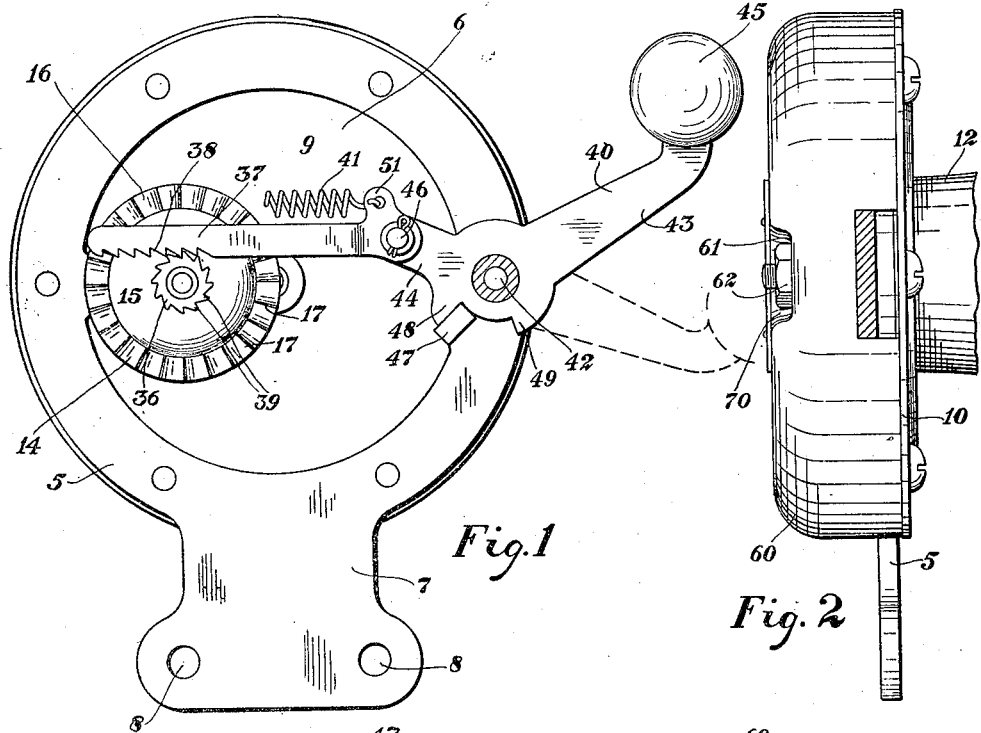
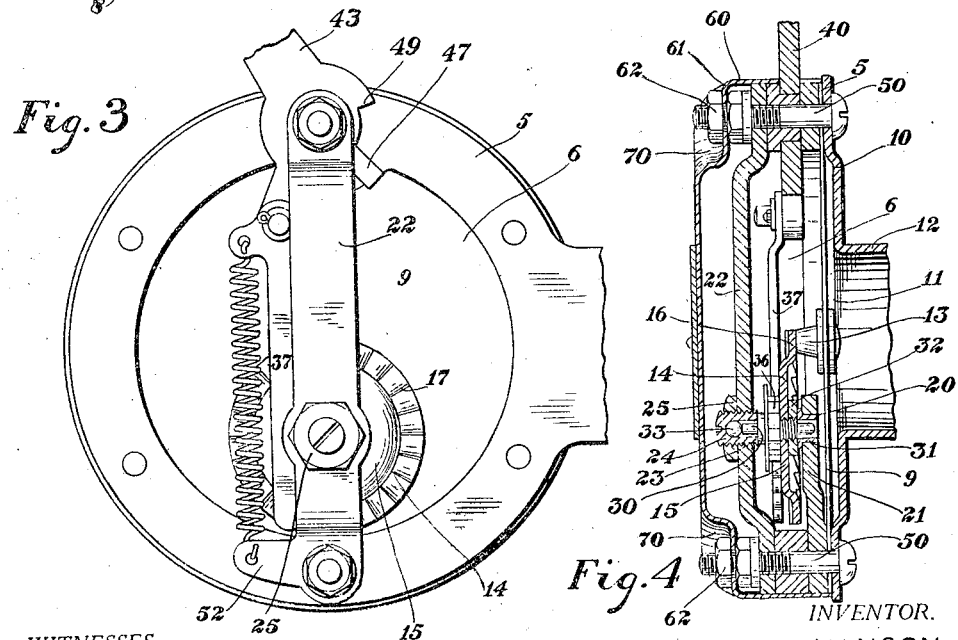

RAY H. MANSON, OF ELYRIA, OHIO, ASSIGNOR TO THE GARFORD MANUFACTURING COMPANY, OF ELYRIA, OHIO, A CORPORATION OF OHIO.

AUTOMOBILE OR MOTORCYCLE HORN.

1,328,093. Specification of Letters Patent. Patented Jan. 13, 1920.

Application filed October 23, 1913. Serial No. 796,753.

*To all whom it may concern:*

Be it known that I, RAY H. MANSON, a citizen of the United States, residing at Elyria, in the county of Lorain and State of Ohio, have invented certain new and useful Improvements in Automobile or Motorcycle Horns; and I do hereby declare the following to be a full, clear, and exact description of the invention, such as will enable others skilled in the art to which it appertains to make and use the same.

My invention relates to automobile or motorcycle horns, and more particularly to horns of this type which are operated through mechanical means as distinguished from those operated through electrical means. In the use of automobiles and motorcycles, as is well known, the operator of the vehicle must be provided with a signaling device to give warning of the approach of the vehicle. In the motorcycle trade a horn is desired which is small, compact, rigid and which is at the same time capable of giving an adequate warning of the approach of this type of vehicle, which is frequently, if not generally, run at a fairly high rate of speed and approaches the person warned very quickly.

One of the objects of my invention is to provide a device meeting these requirements, which is operated manually and in which the power for operating the same is furnished by the driver.

Another object of my invention is to provide a device of this class in which the horn will, when started, continue to operate for at least a brief period of time and which will continue to operate while the propelling mechanism is restored to normal position, whence the sound producing mechanism may be agitated again, thus producing a continuous signal.

Another object of my invention is to provide an arrangement whereby the parts may be made readily accessible without disturbing the relations between the same. In many of the horns of the prior art the removal of the parts necessary to give access to the interior of the horn disturbs the adjustment or other relation between the operating parts. In my horn a portion of the casing may be removed without in any way disturbing the adjustments.

Another object of my invention is to accomplish the last named object and at the same time reduce the parts required to manufacture the horn by employing a common device for connecting all the parts together, at the same time permitting the removal of a part of the casing without disturbing the relation between the other parts.

Other objects of my invention and the invention itself will be probably better understood from a description of an embodiment of the invention.

Figure 1 is a rear elevation of an embodiment of my invention with the cover removed.

Fig. 2 is a side elevation with the cover on.

Fig. 3 is a rear elevation showing the bridge.

Fig. 4 is a vertical section.

Referring now to the embodiment of my invention illustrated in the drawings, at 5 I have illustrated a frame piece which here consists of a flat piece of metal cut away in the center to form an opening 6. Suitable means are provided for connecting the frame to the body of the vehicle or other support, which is here shown as a bracket 7 integral with the frame piece 5. This bracket may be provided with openings 8 through which it is attached by some suitable means, such as bolts or screws, to the body of the vehicle. Suitable means is provided for causing the signal to sound, here shown as a vibratile diaphragm 9 mounted on the front of the frame member 5 and exposed from the rear through the opening 6. A front casing 10 is provided which is mounted in front of the diaphragm 9 and attached to the frame piece in a manner to be described. The front 10 is provided with an opening 11 for the egress of sound waves and a resonator 12 may be mounted in said opening preferably integral with the casing front. The diaphragm is adapted to produce a signal in the well known way when agitated and I provide suitable means for mechanically agitating the diaphragm, so as to produce an adequate signal.

In the form shown, an anvil 13 is mounted on the diaphragm, preferably riveted thereto and means are provided for forcibly displacing this anvil and the diaphragm with it. This may be done by a cam member, here shown as a rotatable cam wheel 14.

This cam wheel may be pressed out of a single piece of metal, as I have illustrated in the embodiment, having a central portion 15 and a rim 16 more or less displaced therefrom, preferably toward the anvil 13. The cams 17 are pressed or otherwise formed into the surface of the rim 16. The cam member is provided with a suitable bearing and journals. In the form shown one of the journals 20 is formed in a member 21 supported from the frame piece and preferably being integral with the frame piece and cut therefrom when the opening 6 is formed in the frame piece. The other journal may be formed in a bridge 22, spanning the opening 6 and connected to the frame piece 5 in a manner to be described.

An opening 23 is formed in the bridge piece and a hollow threaded member 24 inserted therein, the member 24 being adjustable in the opening 23. A nut 25 is placed on the member 24 to hold the same in position. The cam member 14 is mounted upon a shaft 30 which is mounted in the said journals, one end being inclosed within the hollow portion of the member 24 and the other in the opening in the member 21 into which a ferrule 31 may be placed forming the journal 20. A washer 32 may be employed to separate the members 30 and 31. I may also provide a ball-bearing 33 for the axle of the wheel 14, and the same may be placed in the hollow of the member 24. Suitable means are provided for rotating the member 14, here shown as a ratchet wheel and rack. The wheel is shown at 36 keyed or otherwise rigidly secured to the axle of the wheel 14, so that the two rotate together. The rack is shown at 37 and is provided with a plurality of ratchet teeth 38 which coöperate with the teeth 39 on the wheel 36. The teeth are so arranged that the ratchet rack rotates the wheel when moved in one direction only, the teeth sliding over each other when the rack is moved in the other direction. This may be accomplished by making the pitch on one side of the teeth greater than on the other and facing the teeth oppositely, as shown in the drawing. Suitable means is provided for moving the ratchet rack, here shown as a lever 40 and a spring 41. The lever 40 is pivoted at 42 in the frame piece and is provided with two arms 43 and 44, one of which may bear a handle 45 and the other of which is connected to the rack 37 and preferably pivoted thereto by a pin 46. Suitable means is provided for limiting the movement of the lever, here shown as a lug 47 mounted on the frame piece and preferably integral therewith and two lugs 48 and 49 on the lever, preferably integral therewith. The frame piece, the diaphragm, the casing front and the bridge are shown as connected together by a single means, such as bolts 50. One of these bolts may also form a pivot pin for the lever.

The spring is associated with the ratchet rack in such a way as to return the same after it has been displaced by the lever. In order to do this, I may connect it at one end to a lug 51 upon the rack and at the other end to a lug 52 upon the bridge. A rear casing may be employed and is here shown at 60. The material of the casing is depressed at suitable places, such as shown at 61 along the edge thereof and pierced for the projection of the bolts 50. Nuts 62 are then placed upon the bolts and sunken into the sockets 70 thus formed in the casing, providing a readily accessible means for inclosing the apparatus and at the same time protecting said nuts and preventing them catching on the clothing of the driver or other objects. The casing may be removed by removing the nuts 62 without disturbing the association of the rest of the apparatus.

I thus provide suitable means for connecting the apparatus together and the casing upon the rear of the horn, and at the same time make the casing removable without disturbing the rest of the apparatus.

When it is desired to sound a signal, the lever 40 is operated, moving the member 43 to the dotted line position shown in Fig. 1. The teeth on the ratchet rack engage the teeth on the ratchet wheel, giving the same a sudden rotation, whereupon the cam upon the cam wheel begins to rotate, forcibly displacing the anvil 13 and forcibly vibrating the diaphragm. At the same time, the spring 41 is expanded. When the lug 49 engages the lug 47, limiting the downward movement of the lever, the cam wheel continues to rotate the ratchet teeth upon the wheel passing freely over the ratchet teeth upon the rack. The lever 40 is released, whereupon the spring 41 contracts, drawing the rack and lever back to the position shown in Fig. 1. The cam wheel continues to rotate, owing to the momentum given it by the first operation of the lever. The rotary cam and the moving parts are provided with means, such as heavy parts, to increase the momentum. The weight of these parts may be varied to provide the momentum required to operate the diaphragm during the return period. By repeatedly operating the lever 40 a continuous signal may be produced, since the momentum of the apparatus will actuate the diaphragm while the lever is being returned to get a fresh grip upon the cam wheel.

When it is desired to gain access to the horn, the nuts 62 may be removed and the rear casing 60 removed, without disturbing the adjustments or other relations between the various parts of the horn. This overcomes the objections to many horns in which such relations are disturbed when the casing portion is removed to gain access thereto, and the objection to other forms of horns which employ a plurality of parts for fastening the means together to overcome the first objection, or else complicate the parts for that purpose. By reducing the number of parts employed and the number of operations required to manufacture the various parts, I greatly reduce the cost of manufacture of the device and at the same time increase its convenience and utility.

I have illustrated this embodiment of my invention for the purpose of illustrating my invention, and not that I wish to be limited to the details thereof or to the particular form shown. In fact, I contemplate numerous and extensive departures from the form and details shown.

I claim:—

1. In an automobile horn, the combination of a frame, a vibratile diaphragm in said frame, bearings in said frame, a shaft in said bearings, a rotary cam wheel mounted on said shaft to rotate therewith, means through which the cam wheel operates the diaphragm when the cam wheel is rotated, mechanical means for operating the cam wheel including two members, one of which is mounted on the shaft and the other of which is a reciprocating rack mounted in said frame, each of said members having teeth thereon, said teeth having a greater pitch on one side than on the other, the sides of the teeth which have the greatest pitch adapted to engage each other, and the sides of the teeth having the least pitch adapted to pass freely over each other.

2. In an automobile horn, the combination of a frame, a vibratile sonorous diaphragm associated with said frame, a shaft in said frame, a rotary cam wheel rigidly fastened on said shaft to turn with the shaft, mechanical means through which the cam wheel operates the diaphragm when rotated, mechanical means for operating the wheel including a toothed wheel on the shaft concentric with the cam wheel, and a hand operated reciprocatory rack in the frame, said rack being provided with teeth which engage the teeth on the toothed wheel to cause the rotation of the same when the rack is moved in one direction and which move freely over the teeth on the wheel when moved in the other direction.

3. In an automobile horn, the combination of a frame, a vibratile sonorous diaphragm connected to said frame, a shaft rotatably mounted in said frame, a cam member connected on said shaft and rotating with said shaft when the shaft is rotated, an anvil on the diaphragm engaged by the cam teeth on the cam member when the same is moved, thereby causing the vibration of the diaphragm, a ratchet member on said shaft connected thereto and rotating therewith, said ratchet member being concentric with the cam member, a ratchet rack in said frame provided with teeth normally engaging the teeth on the ratchet member and adapted when the rack is moved in one direction to cause the rotation of said ratchet and cam members, the teeth on the rack and the teeth on the ratchet member moving freely with respect to each other when the rack is moved in the other direction, and manual means for operating the rack.

4. In an automobile horn, the combination of a vibratile sonorous diaphragm, a frame and means to connect the edges of the diaphragm to the frame leaving the central portion of the diaphragm free to vibrate when agitated, an anvil on the central portion of the diaphragm through which the diaphragm may be agitated, a shaft in the frame, a cam wheel for causing the agitation of the diaphragm through the anvil and a ratchet wheel concentric with the cam wheel, said ratchet wheel and cam wheel mounted on the shaft to rotate together, a rack in the frame provided with ratchet teeth to coöperate with the ratchet wheel, and means for operating said rack.

5. In an automobile horn, the combination of a vibratile sound producing diaphragm, a frame, means to connect the edge of the diaphragm to the frame leaving the central part free to vibrate, an anvil on the central part of the diaphragm, a heavy rotary cam wheel adapted when rotated to strike the anvil to cause the diaphragm to vibrate, a shaft mounted in the frame and carrying said cam wheel, a plurality of ratchet teeth on the shaft, a reciprocatory ratchet rack provided with a plurality of teeth engaging directly the teeth on the shaft and causing the rotation thereof when the rack is reciprocated in one direction, hand operated means in said frame for moving the rack in one direction to actuate the cam wheel, and a spring associated at one end with said rack and at the other end with the frame for restoring said rack and hand operated means to normal when the pressure is released therefrom.

6. In an automobile horn, the combination of a frame piece, a sonorous diaphragm supported from said frame piece, a casing front, means to agitate said diaphragm, a support therefor, a plurality of bolts connecting said front, diaphragm, support and frame piece together, a casing back and means to connect said casing back to the other parts of said horn through said bolts, said second mentioned means being removable whereby the back may be removed without disturbing the relation between the other parts.

7. In an automobile horn, the combination of a frame piece, a sonorous member, casing front and means to agitate said sonorous member supported from said frame piece, a plurality of bolts connecting said frame piece, sonorous member and front together, a casing back, nuts to connect said back to said bolts independently of the association of the other parts by the bolts, said nuts being removable to remove said casing back without disturbing the relation between the other parts.

In witness whereof, I have affixed my signature in the presence of two witnesses, this 18th day of October, 1913.

RAY H. MANSON.

Witnesses:
GEO. E. ROBERTS,
W. R. SCHALL.